(12) United States Patent
Kühnel

(10) Patent No.: US 7,135,794 B2
(45) Date of Patent: Nov. 14, 2006

(54) SPRING SUPPORT HAVING A HEIGHT-ADJUSTABLE SPRING PLATE

(75) Inventor: Joachim Kühnel, Dittelbrunn (DE)

(73) Assignee: ZF Sachs AG, Schweinfurt (DE)

( * ) Notice: Subject to any disclaimer, the term of this patent is extended or adjusted under 35 U.S.C. 154(b) by 258 days.

(21) Appl. No.: 10/640,695

(22) Filed: Aug. 13, 2003

(65) Prior Publication Data

US 2004/0075350 A1    Apr. 22, 2004

(30) Foreign Application Priority Data

Aug. 13, 2002    (DE) ................ 102 37 644

(51) Int. Cl.
*H02K 7/06* (2006.01)

(52) U.S. Cl. .............. 310/80; 310/75 R; 310/12; 310/15; 310/13; 74/89.23; 74/89.36

(58) Field of Classification Search .............. 310/80, 310/75 R, 12, 15, 13; 74/89.23, 89.34, 89.36, 74/424.71; 280/124
See application file for complete search history.

(56) References Cited

U.S. PATENT DOCUMENTS

| | | | | |
|---|---|---|---|---|
| 2,751,508 A | * | 6/1956 | Marsh et al. ............... 307/10.1 |
| 3,077,248 A | * | 2/1963 | Wayt ...................... 188/112 R |
| 3,741,581 A | * | 6/1973 | Patrin .................... 280/86.758 |
| 4,805,740 A | * | 2/1989 | Wilke et al. ................. 188/173 |
| 4,877,098 A | * | 10/1989 | Asanuma .................... 180/402 |
| 4,934,097 A | * | 6/1990 | Quante ......................... 49/49 |
| 5,027,048 A | * | 6/1991 | Masrur et al. ............... 318/806 |
| 5,053,660 A | * | 10/1991 | Sneddon ...................... 310/80 |
| 5,381,702 A | * | 1/1995 | Ohno ........................ 74/89.25 |
| 5,829,557 A | * | 11/1998 | Halasy-Wimmer et al. ........................... 188/162 |
| 6,453,761 B1 | * | 9/2002 | Babinski .................... 74/89.34 |
| 6,546,825 B1 | * | 4/2003 | Kugle ....................... 74/89.23 |
| 6,857,625 B1 | * | 2/2005 | Loser et al. ................. 267/175 |
| 2004/0036206 A1 | | 2/2004 | Loser et al. |

FOREIGN PATENT DOCUMENTS

| | | |
|---|---|---|
| DE | 934 332 | 10/1955 |
| DE | 199 55 410 | 5/2001 |
| DE | 101 01 694 C1 | 5/2002 |
| WO | WO 02/08001 | 1/2002 |
| WO | WO 2004/048135 | 6/2004 |

* cited by examiner

*Primary Examiner*—Burton S. Mullins
*Assistant Examiner*—Yahveh Comas
(74) *Attorney, Agent, or Firm*—Cohen, Pontani, Lieberman & Pavane

(57) ABSTRACT

Spring support having at least one axially moveable spring plate, an actuator with a rotor producing a rotational movement relative to its stator, which is converted into an axial movement of the spring plate, and a torsional locking element which prevents torsional movement of the spring plate.

10 Claims, 3 Drawing Sheets

SPRING SUPPORT HAVING A HEIGHT-ADJUSTABLE SPRING PLATE

BACKGROUND OF THE INVENTION

1. Field of the Invention

The invention relates to a spring support having an axially movable spring plate, an actuator including a rotor and a stator, force-transmitting element which moves axially in response to rotation of the rotor, and a spring plate fixed to the force transmitting element.

2. Description of the Related Art

WO 02/055326 describes a vehicle suspension in which a vibration damper has an axially adjustable spring plate. An electric motor having an external stator and an internal rotor, the rotational movement of which is translated into an axial movement by a movement converting device in the form of a threaded spindle, serves as actuator. The inner side of the rotor and an outer side of a sleeve-shaped extension of the axially moveable spring plate form the threaded spindle.

In order to fulfill the function of a threaded spindle it is necessary that the spring plate be incapable of performing a rotational movement. Two possible ways of achieving this are proposed. On the one hand it is described how the vehicle suspension spring acts to brace the torque in opposition to the drive torque of the electric motor. A circumferential force is thereby introduced into the vehicle suspension spring about its longitudinal axis. It is to be feared that in addition to the forced vibration emanating from the sprung wheel, a second vibration also acts on the vehicle spring, namely that resulting from the torque bracing of the spring plate in opposition to the drive torque of the electric motor.

As an alternative it is stated that the spring plate can also be torsionally locked by bracing against the vehicle body. The dome for attaching the spring strut to the vehicle body is singled out as being a particularly suitable point. On closer examination, however, it will be noted that producing a torsional safeguard, such as a crease in the dome, is very difficult. Furthermore fitting the spring plate into a torsional safeguard of the spring plate is a laborious task, since direct visual sighting of the outside of the spring plate and the inside wall of the dome is obscured by the annular electric motor.

SUMMARY OF THE INVENTION

An object of the present invention is to provide a spring support having an actuator for an axially moveable spring plate connected to a movement converting device with a view to achieving the simplest possible torque bracing in opposition to the drive torque of the actuator.

According to the invention the object is achieved in that a torsional locking element, which has a positively interlocking connection with the spring plate, is fixed to a housing of the actuator as the torque bracing device.

The essential advantage of the invention resides in the fact that the torques for bracing the movement converting device are reliably absorbed. Influences acting on other components of the spring support, such as a vehicle suspension spring, for example, are prevented.

In a further design development the torsional locking element has an axial guide. The spring plate can move only within the range determined by the axial guide.

According to a further advantageous subordinate claim a spindle is used as movement converting device, the rotor having a force introducing profile on its outer side and a force transmitting element of the spring plate having a mating profile on its inner side.

It is also proposed that the torsional locking element should act radially on a force transmitting element of the spring plate. The pitch circle for the engagement of the torsional locking element on the force transmitting element of the spring plate may be comparatively large, thereby affording considerable advantages with regard to any friction torque occurring.

With a view to maximum ease of assembly of the force transmitting element of the spring plate with the torsional locking element, the latter takes the form of a sleeve. In addition, a sleeve affords a high deformation resistance for a low weight.

Alternatively the torsional locking element may take the form of a swivel-mounted strut, which is braced against a component fixed to the body. This variant simplifies the construction of the actuator with regard to the attachment of the torsional locking element.

The rotor is furthermore arranged radially outside the torque generating surfaces of the stator. In the case of an actuator in the form of an electric motor, this spatial arrangement of rotor and stator in a predefined design space achieves a comparatively higher drive torque than with a so-called inside rotor, in which the rotor is arranged inside the stator.

According to an advantageous feature the force introducing profile of the rotor is formed on a smaller pitch circle than the torque generating surfaces. Overall, this produces a very compact connection between actuator and movement converting device.

In addition, the housing of the actuator may be braced above a passage in the vehicle body for the spring support. This facility is also enhanced by the particular spatial configuration of the rotor.

In order to make the spring support with the actuator, in so far as possible, just as easy to fit to a vehicle as a conventional spring support, a rod of the spring support is braced against the housing of the actuator.

In a further variant the stator braces its drive torque against the rod of the spring support. This makes it possible to use a more lightweight housing for the actuator. This furthermore provides an advantage in terms of radial design space.

In addition, the torsional locking element can also be braced against the rod. Among other things, this feature affords the advantage that no special adjustments need to be undertaken for fixing the spring support to the vehicle body.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1A:
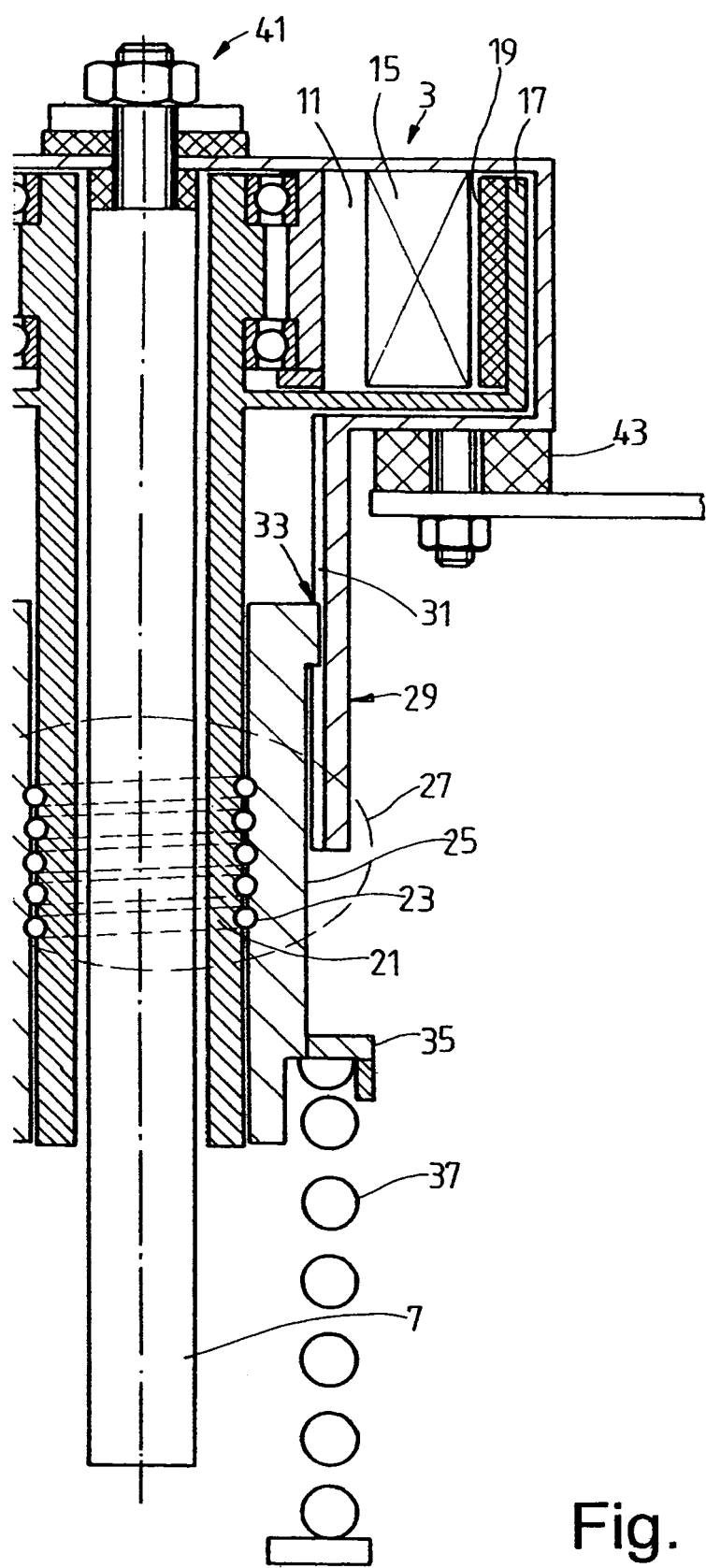
FIG. 1A is a partial section view of a spring support with actuator and a housing resting on the vehicle body.

FIG. 1A is confined to the upper part of a spring support 1 having an actuator 3 on a vehicle body 5. The spring support may be a vibration damper, for example, of which the rod 7 is represented.

The actuator 3 is arranged inside a housing 9 and has a stator 11 fixed to the housing, with torque generating surfaces 13 comprising a number of coils 15, and a rotor 17, arranged radially outside this and having torque generating surfaces 19 in the form, for example, of permanent magnets. Theoretically, the design of the actuator may differ from this principle with regard to the technical design of the torque generating surfaces.

The rotor 17 is supported inside on the stator and extends concentrically around the rod 7. Arranged on the outside thereof is a force introducing profile 21, which together with a mating profile 23 on an inner side of a force transmitting element 25 forms a movement converting device in the form of a spindle 27. Rolling elements may be used between the engaging profiles so as to minimize friction inside the spindle. A torque bracing device in the form of a torsional locking element 29 with an axial guide 31 is used for the force transmitting element, so that the force transmitting element 25 is only capable of performing an axial movement. By means of at least one radial projection 33, the force transmitting element 25 meshes by positive interlocking engagement in the axial guide 31 of the torsional locking element. In FIG. 1A the torsional locking element takes the form of a sleeve, which is fixed to the housing 9. In order to minimize the friction inside the axial guide 31, the torsional locking element 29 acts radially on the force transmitting element 25. A spring plate 35 is operatively connected to the force transmitting element, so that an axial movement of the force transmitting element is transmitted to the spring plate, in order to able to adjust the pretensioning and hence the load-bearing capacity of a vehicle suspension spring 37.

The vehicle body 5 has a passage 39 for the rotor 17 and the torsional locking element 29. For reasons of overall space, therefore, the force introducing profile 21 of the rotor for the movement converting device 27 is formed on a smaller pitch circle than the torque generating surface 19 of the rotor. This in turn allows the housing 9 of the actuator 3 to be braced above the passage 39 in the vehicle body for the spring support. The rod 7 of the spring support can in turn be braced on the housing 9 of the actuator by way of a bearing 41 shown only in notional form.

In order to adjust the spring constant of the vehicle suspension spring 37, a current is passed through the coil 15 of the stator 11, causing the rotor 17 to perform a rotational movement. The stator can brace its drive torque against the housing 9, which is fixed by way of a bearing 43 to the vehicle body 5. The rotational movement of the rotor is converted into an axial movement by the movement converting device 27 interacting with the force transmitting element 25 and the torsionally locking element with its axial guide 31, so that no forces act on the spring plate 35 in a circumferential direction.

Figure 1B:
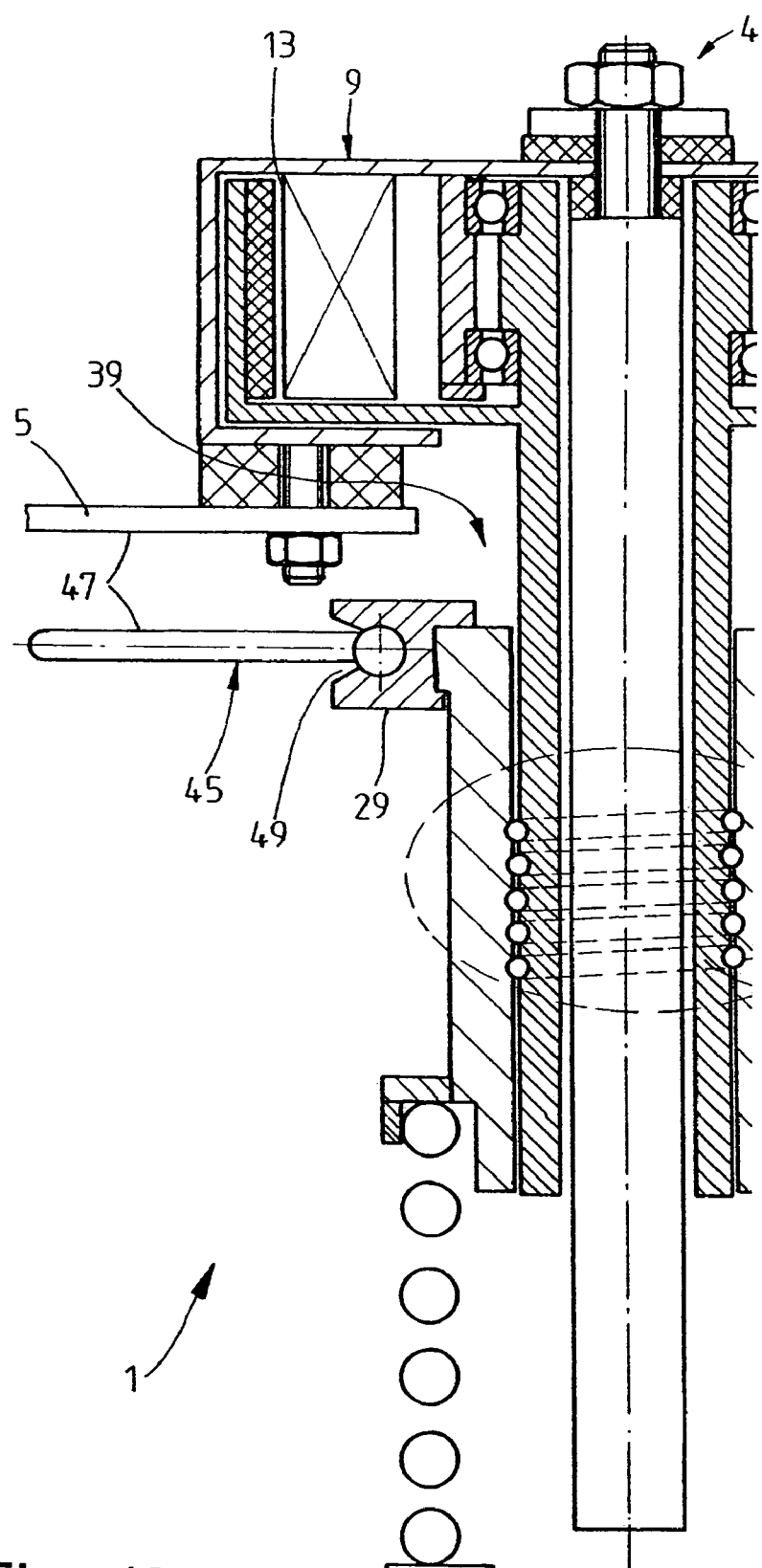
FIG. 1B is a partial section view similar to FIG. 1A, showing an alternative torsional locking element.

In FIG. 1B a swivel-mounted strut 45, which is nevertheless held in a circumferential direction by a swivel bearing 47 against the movement of the rotor, is used as torsional locking element 29 instead of a sleeve with an axial guide 31. The torsional locking element advantageously has a ball joint 49, in order that no distortions occur inside the movement converting device 27 during a swivel movement of the strut 45.

Figure 2:
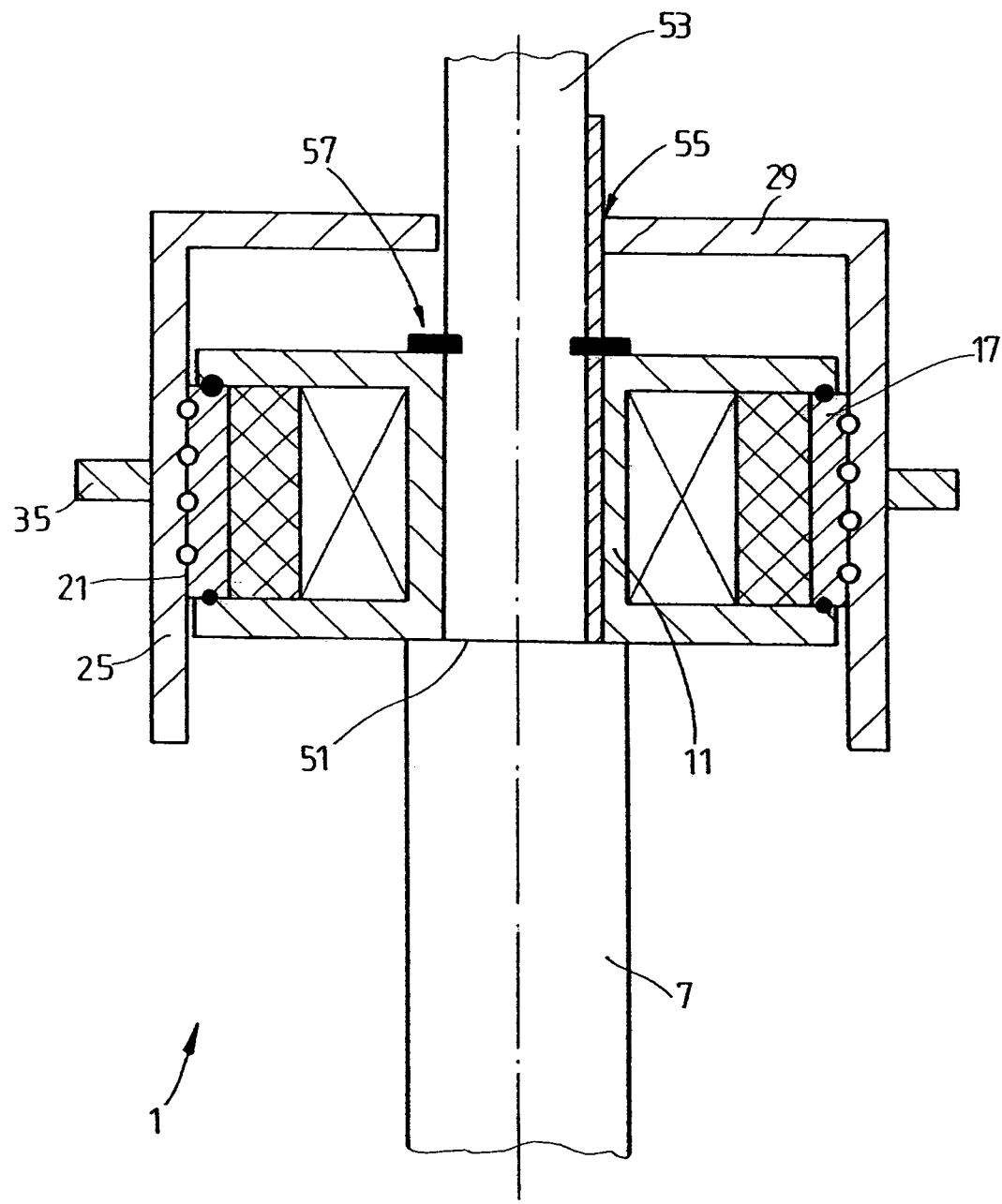
FIG. 2 shows a spring support with actuator on an axially moveable rod of the spring support.

FIG. 2 differs from the embodiment according to FIGS. 1A and 1B in that the stator 11 braces its drive torque against the rod 7. The rod 7 has a step 51, on which the housing 9 of the actuator 3 is axially positioned. A section 53 of the rod 7 axially adjoining the step 51 has a positively interlocking connection 55, which is formed by a spline, for example, and which engages in the stator. A retaining ring 57 prevents an axial displacing movement of the stator in relation to the rod 7. The rotor 17, the length of which is essentially limited to the length of the stator, is in turn arranged radially outside the stator. The force introducing profile 21 is in turn arranged on the outside of the rotor 17, and again concentrically with this the force transmitting element 25 to the spring plate 35. A further significant difference compared to FIGS. 1A and 1B is that the torsional locking element 29 is circumferentially braced against the rod 7. In this variant the torsional locking element slides integrally with the force transmitting element 29 on the spline 55 in the rod 7. The rod 7 of the spring support is attached to a vehicle body by way of a bearing (not shown) of any design.

The adjusting movement of the spring plate operates on the same principle as that described in relation to FIG. 1A.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A spring support comprising:
    a housing;
    an actuator in said housing, said actuator comprising a stator which is fixed with respect to said housing and a rotor which is operable to rotate in said housing, said rotor being arranged radially outside of said stator and having an outer side with a force introducing profile;
    a force transmitting element which moves axially in response to rotation of said rotor, said force transmitting element having an inner side with a mating profile which cooperates with said force introducing profile to convert rotational movement to axial movement;
    a torsional locking element which prevents rotational movement of said force transmitting element with respect to said housing; and
    a spring plate fixed to said force transmitting element.

2. A spring support as in claim 1 wherein said torsional locking element acts radially on said force transmitting element.

3. A spring support as in claim 1 wherein said torsional locking element comprises a sleeve.

4. A spring support as in claim 1 wherein said sleeve comprises an axial guide for said force-transmitting element.

5. A spring support as in claim 1 wherein said torsional locking element comprises a swivel-mounted strut which braces said torsional locking element against rotation with respect to a vehicle body.

6. A spring support as in claim 2 wherein said rotor has torque generating surfaces which cooperate with said stator, said outer side of said spindle having a smaller radius than said torque generating surfaces.

7. A spring support as in claim 1 further comprising means for fixing said housing to a vehicle body above a passage in said body.

8. A spring support as in claim 7 further comprising a piston rod braced against said housing.

9. A spring support as in claim 8 wherein said stator is braced against rotation with respect to said piston rod.

10. A spring support as in claim 8 wherein said torsional locking element is braced against rotation with respect to said piston rod.

* * * * *